United States Patent Office 2,789,093
Patented Apr. 16, 1957

2,789,093

FILTER ADHESIVES

Edward G. Foehr, San Rafael, Calif., assignor to California Research Corporation, San Francisco, Calif., a corporation of Delaware No Drawing. Application September 28, 1953,
Serial No. 382,861

5 Claims. (Cl. 252—52)

This invention pertains to a filter oil composition which is more readily removable from the filter elements than is possible with present filter oil compositions.

When oil-coated impingement-type filters become clogged with dust so that they are no longer efficient for their purpose the filter elements are removed and laundered. This laundering is usually accomplished by subjecting the filter to the action of strong caustic solutions. When milder methods of laundering are used the filters are not thoroughly cleaned, a portion of the old filter oil composition still adhering to the filter elements. Although the use of caustic solutions has been essential for complete removal of used filter oil compositions from the filter elements, such means are detrimental to the filter elements themselves. The metal surfaces are attacked by the corrosive caustic solutions.

Because of the need for special equipment and skilled labor, this laundering of filter elements is done at special laundering plants.

It is desirable, therefore, that filter elements be coated with filter oil compositions which can be removed from the filter elements without the use of strong caustic solutions or the use of skilled labor.

According to the present invention, it has been discovered that filter adhesives easily removable from filter elements can be prepared by incorporating certain agents in the filter adhesives.

The use of the improved filter oil compositions of this invention increases the ease of removal of the filter oil composition from the filter elements by a simple water-wash which can be done by unskilled maintenance workers while at the same time not adversely affecting the desirable filter oil properties, i. e., the wicking characteristics, retention, ease of application, etc. Also, the filter oil compositions of the present invention are not corrosive to such metals as aluminum. Furthermore, the added agent makes it easier to apply an adequate coating of filter oil to wet or moist filter elements. Thus, by the use of the present added agents, not only does the improved filter oil retain its desirable properties unimpaired, but both its application and removal are simplified and hence can be carried out under less critical conditions, requiring less skilled workers.

The filter oils herein are thickened hydrocarbon oils. The thickening agents include waxes, polyethylenes (as described in Hotten patent application Serial No. 260,023, filed December 5, 1951, now abandoned), polyamides (as described in Hanly patent application Serial No. 327,698, filed December 23, 1952, now U. S. Patent 2,751,040), soaps of fatty acids (as described in Hanly patent application Serial No. 327,699, filed December 23, 1952, now U. S. Patent 2,754,208), etc. The preferred thickening agents are polyethylenes and waxes or mixtures thereof.

The agents which form a part of the filter oil compositions of this invention and which facilitate the removal of the filter adhesive from the filter element are oil-soluble polyoxyalkylene ethers of alkyl phenols. The oil-soluble phenyl polyoxyalkylene ethers may be prepared by alkylating phenol with an olefin containing at least 10, and preferably 10 to 20, carbon atoms under conditions adapted to produce an alkylation reaction product having an average of at least 1.5 alkyl groups per phenol molecule. The olefins may be straight chain olefins such as those produced in the Fischer-Tropsch synthesis, branched chain olefins such as those obtained by polymerizing propylene and butylene, or mixtures of branched and straight chain olefins such as those which may be separated from a heavy cracked naptha by selective adsorption with silica gel. Alcohols or alkyl chlorides having carbon chains of suitable length may also be employed as the alkylating agent. The alkyl phenols produced in the alkylation reaction are then condensed with 8 to 20 molecules of an alkylene oxide such as ethylene oxide, propylene oxide, butylene oxide, etc. with ethylene oxide being preferred, to form the desired polyoxyalkylene ether additive. The number of alkylene oxide molecules which are condensed with a particular polyalkyl phenol varies driectly with the number of alkyl carbon atoms in the alkyl phenol molecule, being larger when the number of alkyl carbon atoms is large. The requirement that the condensation product be substantially oil-soluble imposes an upper limit on the number of alkylene oxide groups which may be condensed with a particular polyalkyl phenol. This maximum is readily ascertained by simple solubility tests. The condensation step need not, however, be rigidly controlled. A suitable additive is obtained by polyalkylating phenol with a wide boiling olefin fraction, condensing the polyalkyl phenol with from about 0.5 to 1.5 times its weight of ethylene oxide and extracting the condensation product with an oil such as kerosene to separate the oil-soluble polyalkylene ether additives.

A suitable method for preparing the polyoxyalkylene additive may be exemplified as follows: 94 grams of phenol were warmed to 45° C. 4.7 grams of gaseous $BF_3$ were bubbled into the warm phenol and there absorbed, forming a $BF_3$ phenolate catalyst. 80.7 grams of phenol were added to the catalyst and the mixture was warmed to 60° C. 481 grams of propylene polymer having an average of 12 carbon atoms in the polymer chain were added to the mixture of phenol and catalyst while stirring the mixture. The polymer was added slowly at a rate such that the temperature of the reaction mixture during the addition did not exceed 80° C. When the addition was complete, the reaction mixture was maintained at 80 to 90° C. for a period of four hours, during which the mixture was continuously stirred. At the end of this period 250 milliliters of 5% sodium carbonate were added to the reaction mixture and the resultant mixture was warmed to 85° C. with stirring. The water layer was removed and discarded and the product was washed with two 250 milliliter portions of water at 85 to 95° C. The product was then stripped to remove the last traces of water and a part of the unreacted olefin by heating to 150° C. at 50 mm. pressure. The reaction product was a mixture of alkyl phenols having an average of 2.1 alkyl groups per phenol molecule.

464 grams of the alkyl phenol reaction product mixture and 2.32 grams of flake sodium hydroxide were introduced into a flask equipped with an air cooled reflux condenser, a thermometer, a stirrer, and a gas inlet tube which dipped below the surface of the alkyl phenol mixture. The mixture was warmed to 180° C., flushed with nitrogen to remove air and moisture, and then flushed with ethylene oxide to displace the nitrogen. The reaction vessel was then sealed and 528 grams of ethylene oxide were bubbled into the reaction mixture at a rate such that the pressure was maintained in the range 0.8 to 1.2 atmospheres. The temperature was held below 210° C. during the addition of the ethylene oxide. When the absorption of the ethylene oxide was complete, the reaction vessel was opened and flushed with nitrogen to remove traces of ethylene oxide. The reaction product was a tan colored waxy semi-solid at room temperature. Its composition may be represented by the following formula:

(A)         $(C_{12}H_{25})_{2.1}\phi O(CH_2CH_2O)_{12}H$

The phenyl polyoxyalkylene glycol ethers used herein according to the present invention can be represented by the following formula:

$(R)_n\phi—O(R')_xH$ wherein R is an alkyl radical having at least 10 carbon atoms, R' is an alkylene oxide radical having from 2 to 8 carbon atoms, preferably 2 to 4 carbon atoms, $n$ is a number having a value from 1 to 3, and $x$ is a number having a value from 1 to 20, preferably less than 10.

Examples of the polyoxyalkylene ethers of alkyl phenols include those illustrated by the following formulas:

$C_8H_{17}\phi O(CH_2CH_2O)H$
$C_8H_{17}\phi O(CH_2CH_2O)_3H$
$C_8H_{17}\phi O(CH_2CH_2O)_5H$
$C_{12}H_{25}\phi O(CH_2CH_2O)_4H$
$C_{12}H_{25}\phi O(CH_2CH_2O)_6H$
$C_{12}H_{25}\phi O(CH_2CH_2O)_7H$
$C_{15}H_{31}\phi O(CH_2CH_2O)_8H$
$(C_{12}H_{25})_2\phi O(CH_2CH_2O)_{16}H$
$(C_{12}H_{25})_2\phi O(CH_2CH_2O)_{12}H$
$(C_{12}H_{25})_{2.11}\phi O(CH_2CH_2O)_8H$
$(C_{12}H_{25})_{2.11}\phi O(CH_2CH_2O)_{12}H$
$(C_{12}H_{25})_{2.11}\phi O(CH_2CH_2O)_{14}H$
$(C_{12}H_{25})_{2.11}\phi O(CH_2CH_2O)_{15}H$
$(C_{12}H_{25})_{2.11}\phi O(CH_2CH_2O)_{12}H$ The amount of phenyl polyoxyalkylene glycol ether used herein to facilitate the removal of the filter oil composition from the filter elements can be from 0.5% by weight to about 5.0%, preferably less than 2.0%.

Polyethylenes used in the preparation of filter adhesives are essentially linear polymers of ethylene of the general formula $$\left(\begin{array}{c} H\ H \\ | \ \ | \\ -C-C- \\ | \ \ | \\ H\ H \end{array}\right)_n$$

wherein "$n$" represents the number of monomers present in the polymers. These polyethylenes, which are solids, include polymers of ethylene having molecular weights ranging from 10,000 to 40,000 as determined by a method set forth in "Polyethylene for Paper Coatings," issued by the Bakelite Company, New York, N. Y. (1951). According to this method, which is a modification of the Staudinger method, the viscosity of a solution of 4 grams of polyethylene in one liter of tetralin is determined at 130° C. The molecular weight is then calculated from the following equation:

$$M = \frac{K \log \eta r}{C}$$

wherein "M" is used to represent the molecular weight, "K" is a constant ($4.03 \times 10^4$ grams per liter), "$\eta r$" the relative viscosity (i. e., viscosity of the solution/viscosity of tetralin) and "C" the base molar concentration, i. e., $$\frac{4.0 \text{ grams/liter}}{14 \text{ grams/mol}(—CH_2)} = \frac{0.285 \text{ mole }(—CH_2)}{\text{liter}}$$

Although polyethylenes useful according to this invention in filter oil compositions can have molecular weights ranging from 10,000 to 40,000 it is preferred to use polyethylenes having molecular weights in the range of 15,000 to 25,000.

Waxes which are used in the filter adhesive compositions of the present invention have average melting points ranging from 70° C. to 140° C., preferably above 90° C., and include petroleum waxes, synthetic waxes, animal waxes, paraffin waxes, etc. It is particularly preferred that the filter adhesives contain paraffin waxes.

Waxes which can be used in the filter adhesive compositions of the present invention include the following (with the average melting points in parentheses): Acrawax (96° C.), Acrawax C (138° C.), Acrawax B (80° C.), Ozowax (76-85° C.), Stroba Wax (98-100° C.), Albacer (95-97° C.), Durocer (120-127° C.) (all of which are trade names for products sold by the Glyco Products Company, Inc. of Brooklyn, New York), beeswax (66° C.), candelilla wax (71° C.), glyceryl monostearate, hentriacontanone (76° C.), etc.

In order to determine the ease by which filter oil compositions can be removed from the filter elements, the following test was employed. A polished steel panel (2" x 3") was dipped in the test oil at room temperature until the panel was completely coated with the oil. The coated panel was then suspended, and the excess oil was allowed to drain therefrom over a period of two hours at room temperature, after which the panel was rapidly moved back and forth in clear water for a period of 15 seconds. The panel was observed to determine the percentage of the panel from which the filter oil composition had been removed.

In Table I hereinbelow are presented the results of the foregoing test on several filter oil compositions with, and without for comparison, phenyl polyoxyalkylene glycol ethers contained therein. The base oil used in the preparation of the filter oil compositions was a California solvent refined paraffin base oil having a viscosity of about 150 S. S. U. at 100° F. The polyoxyalkylene ether used contained two alkyl groups containing an average of 14 carbon atoms and 4 oxyethylene units. The polyethylene thickening agent had a molecular weight of 19,000 and the wax was a petroleum refined wax having a melting point in the range of 160 to 165° F.

*Table I*

| Test No | 1 | 2 | 3 | 4 | 5 | 6 |
|---|---|---|---|---|---|---|
| Filter Oil Composition (percent by weight): | | | | | | |
| Base Oil | 95 | 94 | 93.5 | 92.5 | 97 | 96 |
| Polyoxyalkylene Glycol Ethers | ---- | 1 | ---- | 1 | ---- | 1 |
| Polyethylene | ---- | ---- | 1.5 | 1.5 | 3 | 3 |
| Wax | 5 | 5 | 5.0 | 5.0 | ---- | ---- |
| Clean Panel (Vol. percent): | | | | | | |
| Wash Water Temperature— | | | | | | |
| 110–115° F | 0 | 100 | 0 | * | 0 | 40 |
| 130–135° F | 0 | 100 | * | 30 | 0 | 80 |

*Slight amount.

Whereas the addition of the phenyl polyoxyalkylene glycol ether did not adversely effect the desirable properties of the several filter oil compositions, the above data show that the addition greatly increased the ease of removal of the filter oil composition from the metal. The filter oil compositions, particularly those containing the added agent, could be removed in greater amounts than shown in the above comparative test data by the use of water under pressure.

I claim:

1. A filter adhesive having its desirable properties unimpaired but being substantially improved with respect to ease of application and ease of removal by a simple water wash, comprising a major proportion of a hydrocarbon oil thickened to the consistency of a filter adhesive with a thickening agent selected from the group consisting of polyethylene and petroleum refined waxes having melting points of from 70° to 140° C. and having incorporated therein from about 0.5% to about 5%, by weight, of an alkyl phenyl polyoxyalkylene glycol ether of the formula:

$$(R)_n\phi O(R')_xH$$

wherein R is an alkyl radical of from 10 to 20 carbon atoms, R' is an alkylene oxide radical of from 2 to 4 carbon atoms, n is a number having a value from 1 to 3 and x is a number having a value from 1 to 20.

2. A filter adhesive having its desirable properties unimpaired but being substantially improved with respect to ease of application and ease of removal by a simple water wash, comprising a major proportion of a hydrocarbon oil thickened to the consistency of a filter adhesive with a thickening agent selected from the group consisting of polyethylene and petroleum refined waxes having melting points of from 70° to 140° C. and having incorporated therein from about 0.5% to about 2%, by weight, of an alkyl phenyl polyoxyalkylene glycol ether of the formula:

$$(R)_n\phi O(R')_xH$$

wherein R is an alkyl radical of from 10 to 20 carbon atoms, R' is an alkylene oxide radical of from 2 to 4 carbon atoms, n is a number having a value from 1 to 3 and x is a number having a value from 1 to 20.

3. A filter adhesive composition having improved wicking and retention properties, being readily applied to moist metal filter elements, and being readily removed from said metal filter elements by means of a simple water wash, comprising a major proportion of a hydrocarbon oil thickened to the consistency of a filter adhesive with a polyethylene and having incorporated therein from about 0.5% to about 5%, by weight, of an alkyl phenyl polyoxyalkylene glycol ether of the formula:

$$(R)_n\phi O(R')_xH$$

wherein R is an alkyl radical of from 10 to 20 carbon atoms, R' is an alkylene oxide radical of from 2 to 4 carbon atoms, n is a number having a value from 1 to 3 and x is a number having a value from 1 to 20.

4. A filter adhesive having its desirable properties unimpaired but being substantially improved with respect to ease of application and ease of removal by a simple water wash, comprising a major proportion of a polyethylene thickened hydrocarbon oil and from about 0.5% to about 5%, by weight, of an alkyl phenyl polyoxyalkylene glycol ether of the formula:

$$(C_{14}H_{29})_2\phi - O(CH_2CH_2O)_4H$$

5. A filter adhesive having its desirable properties unimparied but being substantially improved with respect to ease of application and ease of removal by a simple water wash, comprising a major proportion of a hydrocarbon oil thickened to the consistency of a filter adhesive with a petroleum refined wax having a melting point in the range from 70° C. to 140° C. and having incorporated therein from about 0.5% to about 5% by weight of an alkyl phenyl polyoxyalkylene glycol ether of the formula:

$$(C_{14}H_{29})_2\phi - O(CH_2CH_2O)_4H$$

References Cited in the file of this patent

UNITED STATES PATENTS

| | | |
|---|---|---|
| 1,970,578 | Schoeller et al. | Aug. 21, 1934 |
| 2,597,201 | Swiss et al. | May 20, 1952 |
| 2,627,938 | Frohmader et al. | Feb. 10, 1953 |
| 2,635,055 | Figdor | Apr. 14, 1953 |

OTHER REFERENCES

Synthetic Detergents by Antara Products, pamphlet 1950.